UNITED STATES PATENT OFFICE 2,052,320

METHOD OF BLEACHING STARCH

Otto A. Sjostrom, Chicago, Ill., assignor to International Patents Development Company, Wilmington, Del., a corporation of Delaware No Drawing. Application July 14, 1934,
Serial No. 735,296

3 Claims. (Cl. 127—71)

The invention relates to the treatment of corn starch, in order to remove by oxidation, certain substances that give the starch the yellowish tinge which almost all corn starches have, and particularly those made from yellow corn; and to accomplish this without appreciable modification of the starch. While some of the coloration may be due to the presence in the starch of microscopic particles of gluten which are yellowish in color, a part appears to be the result of the pigmentation of the starch itself.

While the coloration of the starch is of little or no importance in respect to the more common uses to which the starch is put, for some purposes it is desirable that the starch should have a pure white appearance. This invention is based upon the discovery that the permanganate salts of potassium or sodium have an oxidizing and a specific decolorizing effect on the starch, and one which, moreover, does not involve any injurious effect to the starch granules if the treatment is of a gentle character to be described, but on the contrary improves the starch in respect to its keeping qualities since the substances giving ordinary starches their yellowish tinge also tend to bring about after a time slight rancidity and odor. Other chemicals, such as chlorine, hydro-chlorites, peroxides, sulphites, and hydro-sulphites also have a bleaching effect on starch, to some extent, but they are all far less effective than the permanganates; and in order that anything like the bleaching effect of the permanganates may be obtained, it is necessary to use much larger quantities of these other chemicals, and this is in a high degree likely to result in a change in the character of the starch granule itself. Starch is exceedingly sensitive to chemical action. The permanganates have little or no perceptible effect on the character of the starch, when used in the small quantities contemplated by the present invention. If used in larger quantities, it will bring about modification of the starch changing it from "thick boiling" to "thin boiling" starch, that is, from a starch which will form a thick paste when cooked in water to one which will form a thin watery paste.

In general the method is to introduce the permanganate into a water mixture of the starch in quantities varying from 0.06% to 0.10% of the weight of the dry substance starch. The material is then agitated, for a greater or lesser time, depending upon the size of the batch and the efficiency of the agitation until the starch liquor turns a deep tan color as the result, apparently, of the chemical reaction between the permanganate and the pigment in the starch and gluten; the reaction resulting in a manganese peroxide compound which gives the starch the brown coloration noted.

The starch liquor is then treated with a reducing agent, preferably sulphurous acid. The sulphurous acid may be added in the form of a water solution of sulphur dioxide; or, preferably, of a solution of sodium bi-sulphite mixed with sulphuric acid; or in the form of a mixture of the so-called "B. S. S.", bi-sulphite solution, used for various purposes in corn products manufacturing plants, and consisting of a water mixture of 80% dry substance sodium bi-sulphite and 20% sodium sulphite, and having a gravity of from 35° to 40° Baumé. The agitation is continued and, under the influence of the sulphurous acid, the manganese peroxide is reduced to manganese sulphate, leaving the starch liquor with a pure white color due to the bleaching of the pigment.

The liquor may then be de-hydrated, on a vacuum filter, for example, and the starch washed, if desired, with fresh water and thereafter dried in any customary manner.

Preferably the sulphurous acid is used in quantities of from 0.08% to 0.14% sulphur dioxide, based on dry substance starch, depending on the amount of permanganate salt used, so as to give, preferably, a definite excess of sulphur dioxide in the starch. This excess of sulphur dioxide may so lower the pH value of the mixture as to bring about a "thinning" of the starch, that is a slight modification of the starch which will render it less "thick boiling" than the ordinary commercial starches. This thinning of the starch is probably due to the catalytic effect of the manganese sulphate.

Thinning may be advantageous or detrimental according to the use to which the starch is put. If detrimental, it can be prevented by the addition to the starch liquor, preferably after the reducing step, of a sufficient amount of suitable alkaline substance such as sodium carbonate. This raising of the pH of the liquor inhibits the thinning.

Example

A water mixture of 10,000 pounds of dry substance starch is made by using sufficient water to give the starch liquor a gravity of about 16° Baumé. This density may, of course, be varied. It is the density which has been found to be the most convenient and suitable.

8 pounds of potassium permanganate are dissolved in 30 to 40 gallons of water, and the solution added slowly to the starch liquor with continued vigorous agitation. This operation may last from 15 to 30 minutes. The liquor turns a deep tan color. The next step is to add the sulphurous acid. About 11 pounds of sulphur dioxide are used. This leaves a definite excess of sulphur-dioxide in the starch liquor, which is desirable in order to insure the completeness of the reaction.

A water solution of the sulphur dioxide may be used, but it is more convenient to use mixtures of sulphites and sulphuric acid. It is possible to add the sulphite solution first and thereafter the sulphuric acid (or the order might be reversed) but apparently in such cases the reaction is not so quick or vigorous.

If dry sodium bi-sulphite is used, 17 pounds of this salt are dissolved in 30 gallons of water, and to this solution are added 4 pounds of 66° Baumé sulphuric acid dissolved in 10 to 15 gallons of water. The mixture is run into the starch liquor immediately after the ingredients have been mixed.

In the case of B. S. S., from 4 to 5 gallons are used, depending upon the percentage of sulphur dioxide in the B. S. S. which can be determined by test. The B. S. S. is diluted by water to 30 gallons and to this is added the same amount of sulphuric acid as is used when sodium bisulphite is employed.

If possible thinning of the starch is to be avoided, an alkaline substance is added to the starch liquor. For example, after the reducing step, the liquor may have about 0.02% of sulphurous acid present; which, in the preferred method of practicing the invention, is in the form of bisulphite. This will mean a pH of about 4.5. To prevent thinning of the starch, under these conditions 4 to 6 pounds of sodium carbonate is added to the liquor which will give the material a pH of 5.5 to 6.0.

It will be understood that the agitation is continued throughout the above described operations.

The bleached starch liquor may then be treated in any suitable manner depending upon the use to which the starch is to be put. Under ordinary circumstances the liquor will be filtered to recover the starch and the starch washed with fresh water and dried.

All modifications within the scope of the appended claims are intended to be covered by the patent.

I claim:

1. Method of removing the organic yellow color in corn starch without appreciably affecting the integrity of the starch granules or changing the thick boiling character of the starch which consists in treating a water suspension of the starch with a permanganate in an amount approximately from 0.06% to 0.1% of the weight of the dry substance starch and then treating the material with sulphur dioxide to reduce the resulting manganese peroxide compound.

2. Method of removing the organic yellow color in corn starch without appreciably affecting the integrity of the starch granules or changing the thick boiling character of the starch which consists in treating a water suspension of the starch with a permanganate in an amount approximately from 0.06% to 0.1% of the weight of the dry substance starch and then treating the material with sulphur dioxide in quantities from 0.08% to 0.14% of the dry substance starch.

3. Method of removing the organic yellow color in corn starch without appreciably affecting the integrity of the starch granules or changing the thick boiling character of the starch which consists in treating a water suspension of the starch with a permanganate in an amount approximately 0.08% of the weight of the dry substance starch; agitating the mixture; introducing into the starch sulphur dioxide in quantity approximately 0.11% of the weight of the dry substance starch; and thereafter filtering and drying the starch.

OTTO A. SJOSTROM.